May 7, 1940. J. KAFOWI 2,200,231
METHOD OF PRODUCING ELONGATED BODIES BY DEFORMATION
Filed July 24, 1937
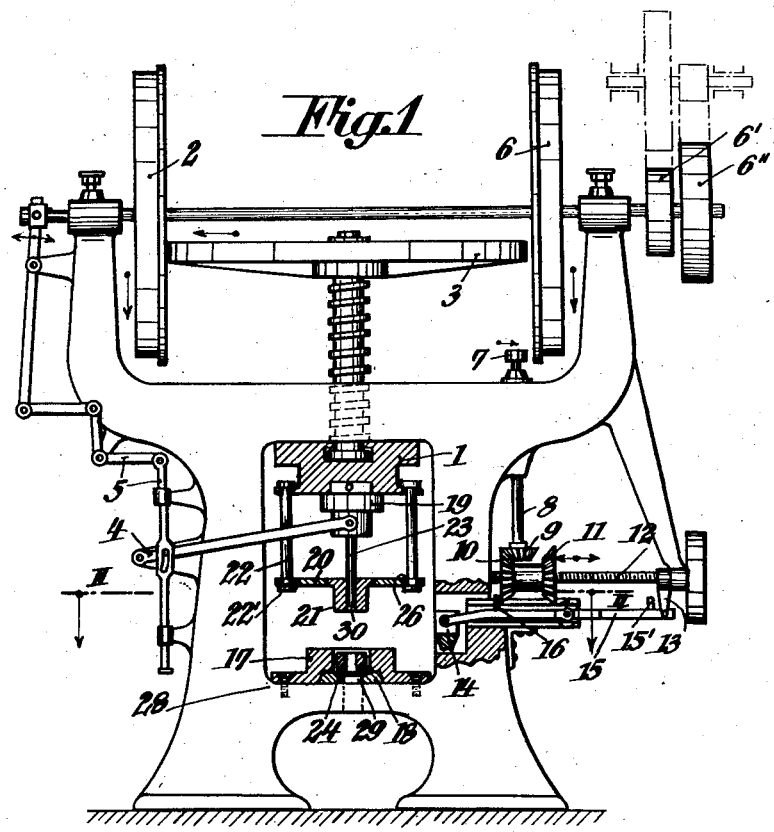
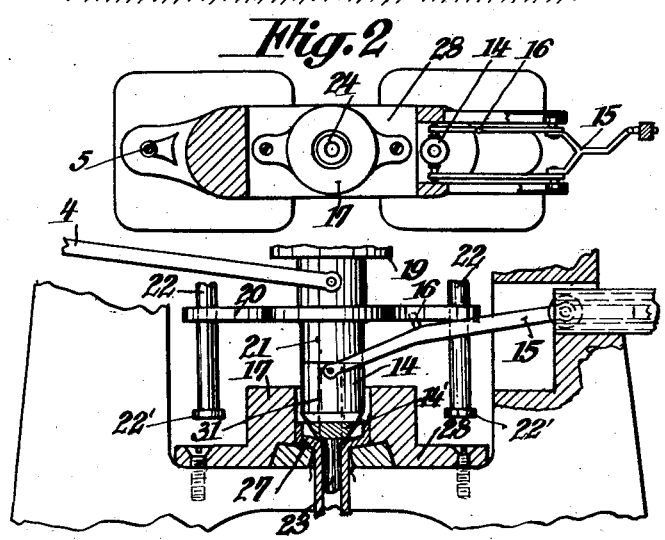

Patented May 7, 1940

2,200,231

UNITED STATES PATENT OFFICE 2,200,231

METHOD OF PRODUCING ELONGATED BODIES BY DEFORMATION

Johann Kafowi, Vienna, Austria, assignor of one-half to Friedrich Goldschmidt, Prague, Czechoslovakia Application July 24, 1937, Serial No. 155,559
In Austria July 30, 1936

2 Claims. (Cl. 207—10)

This invention relates to a method for producing articles of metal or any other suitable material, which articles are relatively long compared with their cross-section, such as tubes and rods, by extrusion.

According to the present invention a blank or billet is heated to a temperature near to its melting point before being subjected to a sudden impact action or hammer blow in a die of an extrusion press.

The expression "a temperature near to its melting point" is intended to mean a temperature at which the blank or billet is in an almost plastic condition, that is a condition such that it offers sufficient resistance to tongs used for inserting it into the die without being deformed by said tongs. Such a condition of the blank or billet has been found to be ideal for extrusion under sudden impact action for the reason that it ensures perfect flow of the material which is not checked by loss of temperature occurring before the sudden impact action while the sudden blow is transformed into heat which compensates for any heat losses.

In carrying the invention into effect any known kind of extrusion press may be employed provided that it is capable of imparting a sudden impact action to the blank or billet to be extruded through a die. In other words the blank or billet must be subjected to the sudden blow of a hammer or plunger which moves at a speed greatly in excess of that possible in ordinary hydraulic or crank lever presses, which are quite unsuitable for carrying out the method of the present invention. One particular form of press for carrying out the invention is illustrated, by way of example, on the accompanying drawing, in which:

Figure 1 is a vertical sectional view of a part of an impact extrusion press for the production of tubes, and Fig. 2 is a similar view on an enlarged scale of a severing plunger, shown within the die, for use in removing the burr, after the production of a tube.

As will be seen in Figure 1, the impact extrusion press has a tup or plunger $c$ provided with an insertion $c_1$ which carries the mandrel $f$. The plunger $c$ has two guides $e$ which pass through holes $i$ in the intermediate plunger portion $d$. The plunger portion $d$ is slidably mounted on the guides $e$ and is thus movable relative to the plunger $c$. The central part of the plunger portion $d$ is formed into a punch or patrix $d_1$ which is adapted to move into a matrix $a$. The matrix $a$ is built into or on the anvil bed $m$ of the press or is made integral therewith and is provided with a second part or die $b$ for forming the extruded article. The die $b$ has a bore $n$ which corresponds to the outer diameter of the extruded article to be produced. The matrix $a$ receives the preferably cylindrical blank $g$.

The method of extruding tubes and the like is carried out as follows:—The tup or plunger $c$, to which the plunger portion $d$, $d_1$ is secured, first drops from its uppermost position until the patrix $d_1$ becomes seated on the blank $g$. The patrix then stops, while the plunger $c$ continues its movement since the guide rods $e$ can slide through the openings $i$ in the portion $d$. During the downward movement of the plunger $c$ the mandrel $f$ slides along its guide in the patrix $d_1$ into position through and projecting below the matrix $a$. This downward movement is effected with substantially no resistance with the full available force, while the pressing operation as such occurs at the end of the unchecked downward movement of the plunger $c$ and the mandrel $f$ with a sudden hammer blow, at the moment when the part $c_1$ strikes the patrix $d_1$ arrested by the blank $g$. The final shape of the extruded article is thus produced from the blank. The mandrel $f$, which has been travelling in advance of the plunger $c$, forms together with the part $b$, a perfect die for extruding the article, which leaves the die in a substantially plastic condition so that, irrespective of the rapidity of the pressing operation, the excluded article retains the desired shape. After the termination of the extrusion operation the extruded article is suspended downwardly to the full extent of its length from the matrix and is cooled down and becomes completely solidified.

Now follows the upward movement. First the mandrel $f$ is pulled out of the extruded article, while the patrix $d$ remains in its position owing to its weight, whereby the mandrel is literally stripped from the extruded article. When the plunger $c$ has been raised to such an extent that the lower heads $q$ of the guide rods $e$ engage the plunger $d$, the latter is lifted and the plunger $c$ with the patrix $d$ again assumes its uppermost position.

When the extrusion of a tube is completed as described, the extruded article must be freed of the burr which is that part of the extruded article, shown at $k$ in Fig. 2, which remains in the matrix $a$ after completion and is still connected with the finished tube, so that the latter can be removed downwardly from the die. A severing device which serves this purpose is shown in Fig.

2 and it comprises a severing plunger $h$ which, in the form shown, is tapered. The conical surface $x$ is roughened to cause the burr to adhere to the severing plunger $h$ when it is lifted. The adherence of the material to the severing plunger is increased due to the contraction of the material as the plunger enters there in its hot state. This severing plunger is inserted either mechanically or manually into the die after the extruding operation has been completed, whereupon the plunger $c$ is again lowered to strike the severing plunger $h$ to effect the severing operation or blow. The severing plunger $h$ is hollow, having a bore $p'$, so that the mandrel $f$ may pass therethrough. The severing plunger $h$ may be removably attached to the part $d$ in any suitable manner so that it may be pulled out of the die by means of the part $d$.

The apparatus described is particularly suitable for carrying out the method of the present invention as the sliding central portion $d$, $d_1$ ensures the full force of the stroke of the plunger being applied to the blank and consequently full utilization of the extruding force.

I claim as my invention:

1. A method of producing articles which are relatively long compared with their cross-section, such as tubes and rods, comprising heating a blank or billet to a temperature near its melting point, and subjecting the blank to a sudden impact blow to extrude the material through a die to form the elongated article.

2. A method of producing articles which are relatively long compared with their cross-section, such as tubes and rods, comprising heating a blank or billet to a temperature near its melting point, subjecting the blank to a sudden impact blow to extrude the material through a die to form the elongated article and severing the burr, formed from the residue of the blank, from the extruded article.

JOHANN KAFOWI.